United States Patent

Hall et al.

[11] Patent Number: 5,245,045
[45] Date of Patent: Sep. 14, 1993

[54] NEAR INFRARED ANTIHALATION DYES

[75] Inventors: Kevin P. Hall, Sawbridgeworth; Ronald W. Burrows, Harlow; Mark P. Kirk, Bishops Stortford, all of England

[73] Assignee: Minnesota Mining and Manufacturing Company, St. Paul, Minn.

[21] Appl. No.: 515,572

[22] Filed: Apr. 27, 1990

[30] Foreign Application Priority Data

May 11, 1989 [GB] United Kingdom ............... 8910824

[51] Int. Cl.$^5$ ................... C07D 231/20; C07D 231/24
[52] U.S. Cl. ................................................. 548/365.1
[58] Field of Search ........................... 548/364, 365.1

[56] References Cited

U.S. PATENT DOCUMENTS 4,619,892  10/1986  Simpson et al. .................... 430/505

FOREIGN PATENT DOCUMENTS 506385  5/1939  United Kingdom .

Primary Examiner—Robert W. Ramsuer
Attorney, Agent, or Firm—Gary L. Griswold; Walter N. Kirn; Mark A. Litman

[57] ABSTRACT

Compounds suitable for use as antihalation or acutance dyes in silver halide photographic emulsions having a nucleus of the general formula (I),

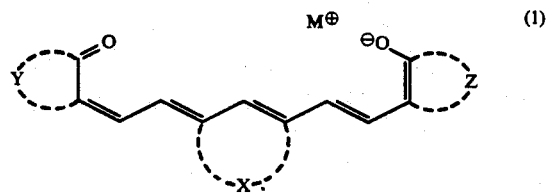

in which:
Y and Z independently represent the non-metallic atoms necessary to complete a carbocyclic or heterocyclic ring or a fused ring system,
M$^\oplus$ is a cation, and,
X represents the non-metallic atoms necessary to complete a 5-, 6- or 7- membered carbocyclic ring, a 5-,6- or 7- membered heterocyclic ring or a fused ring system on a 5-, 6- or 7- membered nucleus and comprising up to 14 total ring atoms selected from C, N, O, S and Se.

5 Claims, No Drawings

NEAR INFRARED ANTIHALATION DYES

FIELD OF THE INVENTION

This invention relates to oxonol dyes and to their preparation and use in photographic materials.

BACKGROUND TO THE INVENTION

There is a need for near infrared (NIR) sensitive silver materials, for both heat processed silver halide and conventional wet processed silver halide constructions, which produce a hard copy from various solid state output devices emitting radiation in the near infrared. For example, silver halide materials sensitized to the red and NIR may be used to produce hard copy from computer stored graphics data via a scanning laser diode source. The wavelengths of interest are primarily in the region 650 to 900 nm.

The silver imaging material requires two types of dye absorbing in the near infrared. One dye must be present in the silver halide emulsion in order to sensitize the silver halide to wavelengths in the NIR. The second dye must be an infrared dye which may be required in a coating separate from the emulsion layer in order to improve image quality. This second dye is known as an antihalation dye and is required to prevent internal reflection of scattered light which would otherwise expose the silver halide emulsion adjacent to the point of intended exposure. Such a dye may also be incorporated in the silver emulsion layer to absorb scattered light and improve the acutance of the image.

Dyes in the antihalation coatings of films sensitive to visible or near infrared radiation must be stable during coating, storage and exposure of the film, but are required to bleach during the processing of the film. The resulting decomposition products should leave essentially no residual stain or near-U.V. absorption in the film. It is known that mono-, tri- and pentamethine oxonol dyes have been useful in antihalation layers and as filter dyes in conventional silver halide formulations sensitive to the visible region. However, the known examples of these classes of dyes do not have suitably long wavelength absorption for use in near infrared sensitive materials. Heptamethine oxonols are known to absorb at longer wavelengths, but very few examples have been prepared and characterised, owing to the instability of the compounds concerned. For example, British Patent No. 506385 discloses such compounds, but does not described their synthesis. In "Rodd's Chemistry of Carbon Compounds" (ed. S. Coffey, 2nd edition, vol. IVB p.140, Elsevier 1977), no data is recorded for heptamethine oxonols. Fabian and Hartman, in "Light Absorption of Organic Colourants" (Springer Verlag, 1980) p.174, state that a few oxonols of chain length greater than 5 have been prepared, but no details are given, except that the compounds are unstable. Grossel et al (Electrochimica Acta Vol. 34 p. 425, 1989) disclose electrochemical data for one heptamethine oxonol dye along with several others of shorter chain length. Generally, these materials of the prior art do not show sufficient stability for photographic use.

A class of heptamethine oxonol dyes has now been found which have particular utility as antihalation dyes in red and NIR sensitive photographic elements.

SUMMARY OF THE INVENTION

According to one aspect of the present invention there is provided a compound having a nucleus of the general formula (I),

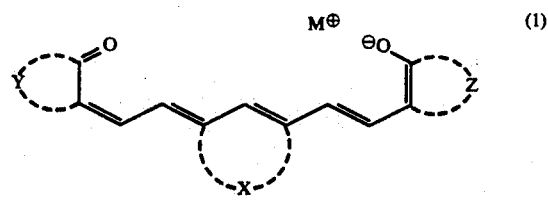

in which:

Y and Z independently represent the non-metallic atoms necessary to complete a carbocyclic or heterocyclic ring or a fused ring system, $M^\oplus$ is a cation, and, X represents the non-metallic atoms necessary to complete a 5-, 6- or 7- membered carbocyclic ring, a 5-, 6- or 7- membered heterocyclic ring or a fused ring system on a 5-, 6- or 7- membered nucleus and comprising up to 14 ring atoms selected from C, N, O, S and Se.

The dyes of general formula (I) absorb strongly in the wavelength ranges 650 to 900 nm. Although the dyes show an absorption maximum in solution that is generally below 800 nm, when the dyes are coated in gelatin or similar binder a broadening of the absorption is often observed so that an absorption useful for antihalation purposes is obtained at longer wavelengths. The dyes of formula (I) are particularly useful as antihalation/acutance dyes in red and NIR sensitive photographic materials because they are stable under normal coating and storage conditions, but when processed by conventional developing and fixing solutions are rendered substantially colourless.

DESCRIPTION OF THE PREFERRED EMBODIMENTS

The groups completed by Y and Z may be any of the conventional groups known in oxonol dyes. The carbocyclic or heterocyclic rings completed by Y and Z are generally 5- or 6- membered rings or fused ring systems on 5- or 6- membered nuclei and contain up to 14 ring atoms selected from C, N, O, S and Se. Examples of core nuclei completed by Y and Z are those ring groups selected from isoxazolone, barbituric acid, thiobarbituric acid, 1,3-indandione, 2-pyrazolin-5-one, 2-thiooxazolidinedione, oxindole, rhodanine, 2-thiohydantoin, 1,3-cyclohexadione, isopropylidene malonate, thianaphthen-3-one and thianaphthen-3-one dioxide. Generally Y and Z complete identical groups.

The heptamethine chain includes a rigidising moiety completed by X, which rigidising moiety is a 5-, 6- or 7-membered carbocyclic or heterocyclic ring or a fused ring system on a 5-, 6- or 7- membered nucleus and comprising up to 14 ring atoms selected from C, N, O, S and Se. A preferred rigidising moiety is formed when X completes a cyclohexene group, which may possess one or more substituents selected from alkyl groups of 1 to 5 carbon atoms, e.g. methyl; aryl groups of up to 10 carbon atoms, e.g. phenyl; and halogen atoms. Most preferably X completes a 4,4-dimethylcyclohexenyl rigidising group.

The presence of a rigidising or bridging moiety improves the stability of the heptamethine chain and imparts a bathochromic shift to the absorption maximum compared to the non-bridged analogues of the prior art. Suprisingly, the bridging of the methine chain does not significantly impair either the solubility of the dyes or their bleaching in conventional silver halide processing conditions.

Other substituents which may be present on the heptamethine chain are selected from those generally known in the art of cyanine and oxonol dyes. The heptamethine chain may possess one or more substituents selected from alkyl groups of 1 to 5 carbon atoms, aryl groups of up to 10 carbon atoms, e.g. phenyl, and halogen atoms, e.g., chlorine.

Suitable cations for $M^\oplus$ include metal ions, e.g. $Na^\oplus$, $K^\oplus$, and quaternary ammonium ions, e.g., $NH^\oplus(C_2H_5)_3$.

A preferred class of dyes has a nucleus of general formula (II):

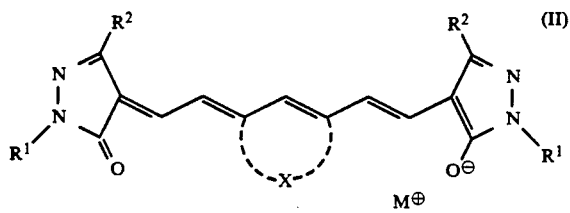

in which:

$M^\oplus$ and X are as defined above.

Each $R^1$ represents: an alkyl group of 1 to 5 carbon atoms, optionally substituted with one or more substituents selected from halogen atoms, hydroxy moieties, alkoxy groups of 1 to 5 carbon atoms, cyano moieties, carboxyl moieties, alkoxy carbonyl groups of 1 to 5 carbon atoms, sulphonic acid moieties and aryl groups of up to 10 carbon atoms, wherein the aryl group may be optionally substituted with one or more substituents selected from alkyl groups of 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties; or $R^1$ may represent an aryl group of up to 10 carbon atoms, optionally substituted with one or more substituents selected from an alkyl group of 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties.

Each $R^2$ represents: an alkyl group of 1 to 5 carbon atoms, optionally substituted with one or more substituents selected from halogen atoms, hydroxy moieties, alkoxy groups of 1 to 5 carbon atoms, cyano moieties, carboxyl moieties, alkoxy carbonyl groups of 1 to 5 carbon atoms, sulphonic acid moieties and aryl groups of up to 10 carbon atoms, wherein the aryl group may be optionally substituted with one or more substituents selected from alkyl groups of 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties; an aryl group of up to 10 carbon atoms, optionally substituted with one or more substituents selected from an alkyl group of 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties; $-CO_2H$; $-CO_2-M^\oplus$ (wherein $M^\oplus$ is defined previously); or $-CO_2R^{12}$, wherein $R^{12}$ is an alkyl group of 1 to 5 carbon atoms, optionally substituted with one or more substituents selected from halogen atoms, hydroxy moieties, alkoxy groups of 1 to 5 carbon atoms and cyano moieties.

Preferably $R^1$ is a phenyl group bearing one or more sulphonic acid moieties, $R^2$ is an alkoxy carbonyl group of 1 to 5 carbon atoms, and X completes a 4,4-dimethylcyclohexenyl ring.

In a most preferred embodiment $R^1$ represents

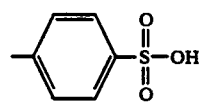

or the meta-substituted analogue, $R^2$ represents $-CO_2CH_2CH_3$, X completes a 4,4-dimethylcyclohexenyl ring and $M^\oplus$ represents $N^\oplus H(C_2H_5)_3$.

A further class of dyes has a nucleus of general formula (III):

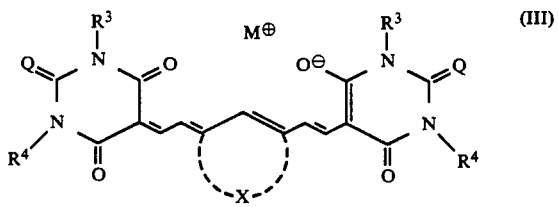

in which:

Q is O or S,

X is as defined above, $R^3$ and $R^4$ independently represent hydrogen; an alkyl group of 1 to 5 carbon atoms which may be substituted by hydroxyl, alkoxyl of 1 to 5 carbon atoms or aryl, generally of 6 carbon atoms, e.g., phenyl; an alkenyl group of 1 to 5 carbon atoms which may be substituted by hydroxyl, alkoxyl of 1 to 5 carbon atoms or aryl, generally of 6 carbon atoms, e.g., phenyl.

The dyes of general formula (I) may be incorporated into photographic elements as antihalation and/or acutance dyes. For antihalation purposes the dyes may be present in a layer separate from the silver halide layer either above or below the silver halide layer. In the case of transparent supports the antihalation layer may be positioned on the surface of the support opposite the silver halide emulsion layer. The dyes are generally included in antihalation layers in amounts to provide a transmission optical density of greater than 0.1 at λ max of the dye. Generally the coating weight of dye which will provide the desired effect is from 0 to 1.0 mg/dm². For acutance purposes the dyes are incorporated within the silver halide emulsion layer, generally in an amount in the range 200 to 1000 mg of dye per liter of wet emulsion.

The dyes of formula (I) may be prepared according to the following reaction scheme:

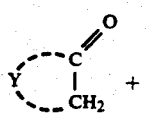 (IV)

The precursors of formula (IV) may be prepared by techniques known in the art, e.g., as disclosed in Yu.H. Slominskii and L. M. Shulezhku, UKr.Khim, Zh. 40(6) pp. 625–9, (1974).

The invention will now be illustrated by the following Examples in which Dyes 1 to 7 were of the following structure:

DYES NOS. 1 TO 5

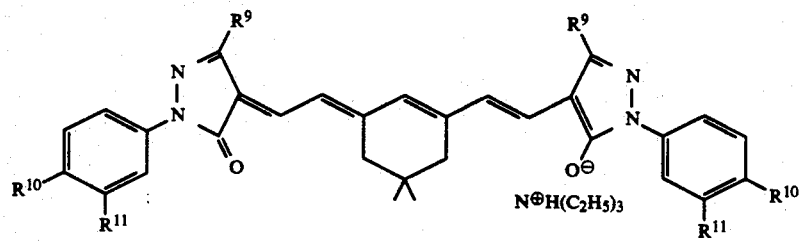

| Dye No. | $R^9$ | $R^{10}$ | $R^{11}$ | $\lambda_{max}$ (nm) |
|---|---|---|---|---|
| 1 | —CH$_3$ | —SO$_3$H | H | 755 |
| 2 | —CO$_2$CH$_2$CH$_3$ | —SO$_3$H | H | 777 |
| 3 | —CO$_2^-$HN$^\oplus$(CH$_2$CH$_3$)$_3$ | —SO$_3$H | H | 764 |
| 4 | —C$_6$H$_5$ | —SO$_3$H | H | 770 |
| 5 | —CO$_2$CH$_2$CH$_3$ | H | —SO$_3$H | 777 |

DYE NO. 6: $\lambda_{max}$ = 708 nm

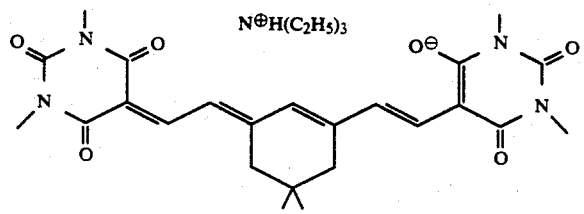

DYE NO. 7: $\lambda_{max}$ = 750 nm

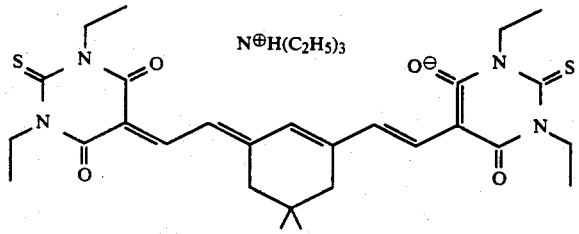

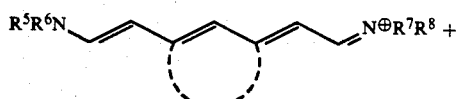

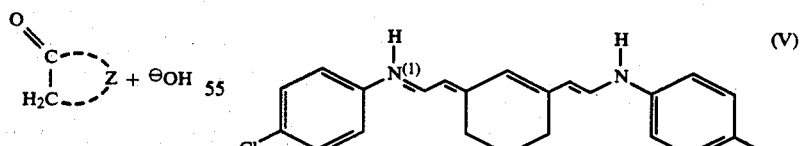

in which:
R$^5$ to R$^8$ independently represent hydrogen atoms, an alkyl group of 1 to 5 carbon atoms or an aryl group, preferably phenyl, which may be substituted, e.g., with halogen atoms, alkoxy groups of 1 to 5 carbon atoms, alkoxycarbonyl groups of 1 to 5 carbon atoms, alkylthio groups of 1 to 5 carbon atoms or cyano groups;

Y, Z, M$^\oplus$ and X are as defined above.

The reaction may be conducted in solution at ambient temperature.

EXAMPLE 1

The intermediate (V) was prepared by a procedure described in Yu. H. Slominskii and L. M. Shulezhku, UKr.Khim, Zh. 40(6) pp.625–9 (1974).

Dye No. 2 was prepared by the following synthesis: 1-(4-sulphophenyl)-3-carbethoxy-5-pyrazolone (6.29 g, 0.02 mol) and triethylamine (5.5 ml, 0.04 mol) were dissolved in ethanol (100 ml) and water (10 ml) and slowly poured, at room temperature, into a solution of (V) (4.44 g, 0.01 mol) in ethanol (150 ml) and stirred at room temperature for three hours. The solution was then filtered. The filtrate was diluted with ether (1000 ml), left in a fridge overnight and filtered again to yield a black solid (2.3 g, 22%) λ max=777 nm (EtOH) $\epsilon = 13.1 \times 10^4$ mol$^{-1}$cm$^{-1}$. The solid from the original filtration was triturated with ether (3×500 ml) to yield, on drying in vacuo, a blue powder (4.23 g, 39%) λ max=777 nm (EtOH) $\epsilon = 5.5 \times 10^4$ mol$^{-1}$cm$^{-1}$.

Dyes Nos. 1, 3, 4 and 5 were prepared by analogous methods starting from the appropriate precursors.

EXAMPLE 2

Dye No. 7 was prepared by the following synthesis: A slurry of (V) (2.21 g, 0.005 mol) in ethanol (75 ml) was treated at room temperature with a solution of 1,3-diethyl-2-thiobarbituric acid (2.16 g, 0.01 mol) in ethanol (20 ml)/triethylamine (1.4 ml, 0.1 mol) and stirred at room temperature for 2.5 hours. The solution was evaporated to dryness, under reduced pressure (water pump), and the residue was triturated with ether (4×250 ml) until the washings were blue with no UV/VIS absorption at 400 nm greater than the background absorption at 500 nm. The resulting solid was dried in vacuo to yield a blue powder (3.1 g, 94%) λ max=750 nm (ETOH) $\epsilon = 11.4 \times 10^4$ mol$^{-1}$cm$^{-1}$.

Dye No. 6 was prepared by an analogous process starting from the appropriate precursors.

EXAMPLE 3

Dyes Nos. 2 to 4, 6 and 7 were evaluated as below: A sample of the dye (50 mg) was dissolved in water or ethanol (5 ml). The solution was added to a 5% aqueous gelatin solution (20 ml) with added wetting agent (Hostapur) and hardener (formaldehyde). The resulting solution was hand coated onto a clear polyester base using a No. 7 KBar and the coatings were allowed to dry and harden. UV/visible absorption spectra were then run before and after processing through 3M RDC II TM chemistry (machine processed) and after 3 days incubation at 50° C. 40% relative humidity. The results are given in the Table. No change in absorption was noted on incubation.

ties. The photographic layer of the imaging film was made up of chlorobromide silver halide emulsion. The emulsion contained a wetting agent, antifoggant, spectral sensitising dye, super sensitiser, gelatin extender and a hardening agent. The photosensitive layer was overcoated with a protective gelatin layer containing a gelatin preservative, surfactant, PMMA dispersion and a gelatin hardening agent. Both the photographic dispersion and the protective gelatin layer were coated on a 7-mil polyester base at a coating thickness necessary to obtain a silver coating weight of 2.4 gm/m2.

The imaging film comprising the antihalation layer and the photosensitive layer was imaged in a 820 nm laser sensitometer. The resulting images were evaluated and found to be devoid of common image defects classically associated with halation. The residual visible dye stain after processing in conventional X-ray developer was negligible.

We claim:

1. A compound having a nucleus of the general formula,

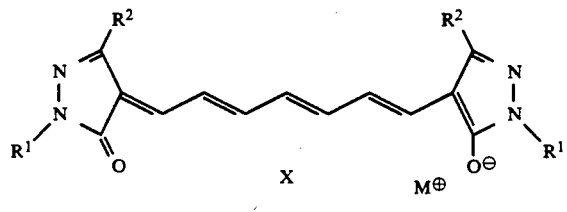

wherein:

M⊕ is a cation,

X represents the non-metallic atoms necessary to complete a 5-, 6- or 7- membered carbocyclic ring, a 5-, 6- or 7- membered heterocyclic ring or a fused ring system on a 5-, 6- or 7- membered nucleus and comprising up to 14 total ring atoms selected from C, N, O, S and Se, and each R$^1$ represents: an alkyl group of 1 to 5 carbon atoms, optionally substituted with one or more substituents which are members selected from the

| Dye No. | Original Absorption at λ max | Absorption at Wavelength λ max (nm) after processing | | | | | | | | | | |
|---|---|---|---|---|---|---|---|---|---|---|---|---|
| | | 350 | 400 | 450 | 500 | 550 | 600 | 650 | 700 | 750 | 800 | 900 |
| 2 | 0.58 | .09 | .03 | .02 | .02 | .02 | .02 | .02 | .01 | .01 | .01 | .02 |
| 3 | 0.18 | .20 | .18 | .06 | .05 | .05 | .05 | .06 | .05 | .03 | .04 | .03 |
| 4 | 0.35 | .18 | .12 | .09 | .08 | .07 | .07 | .09 | .10 | .14 | .20 | .03 |
| 6 | 0.3 | .19 | .15 | .13 | .12 | .11 | .11 | .10 | .10 | .09 | .09 | .09 |
| 7 | 0.3 | .08 | .06 | .04 | .03 | .03 | .03 | .03 | .03 | .03 | .03 | .02 |

EXAMPLE 4

Dye 2 was used with Triton X-100 in a backside antihalation layer of an IR sensitive imaging film. 94 grams of a 0.48% solution of dye in water were added to 60 grams of Triton X-100. The solution was incorporated into 800 grams of a gelatin solution containing 5% gelatin 0.15% anti-bacteria agent, 0.87% PMMA (polymethymethacrylate) dispersion, 0.02% KBr and 0.36% hardening agent. The antihalation layer was overcoated with a protective gelatin coating containing an anionic surfactant, hardening agent, PMMA dispersion and a gelatin preservative. Both solutions were coated on a polyester substrate at a coating thickness necessary to produce the desired 820 nm absorbence of >0.40 OD required for sufficient antihalation propergroup consisting of halogen atoms, hydroxy moieties, alkoxy groups of 1 to 5 carbon atoms, cyano moieties, carboxyl moieties, alkoxy carbonyl groups of 1 to 5 carbon atoms, sulphonic acid moieties and aryl groups of up to 10 carbon atoms, wherein the aryl groups may be optionally substituted with one or more substituents which are members selected from the group consisting of alkyl groups of 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties; or R$^1$ may represent an aryl group of up to 10 carbon atoms, optionally substituted with one or more substituents which are members selected from the group consisting of an alkyl group of 1 to 5 carbon atoms, halogen moieties, alkoxy groups of 1 to 5 carbon atoms, cyano moieties, carboxyl moieties, alkoxy carbonyl groups of 1 to 5 carbon atoms and sulphonic acid moieties, and each $R^2$ represents: an alkyl groups of 1 to 5 carbon atoms, optionally substituted with one or more substituents which are members selected from the group consisting of halogen atoms, hydroxy moieties, alkoxy groups of 1 to 5 carbon atoms, cyano moieties, carboxyl moieties, alkoxy carbonyl groups of 1 to 5 carbon atoms, sulphonic acid moieties and aryl groups of up to 10 carbon atoms, wherein the aryl group may be optionally substituted with one or more substituents which are members selected from the group consisting of alkyl groups 1 to 5 carbon atoms, halogen atoms, hydroxy moieties, alkoxy groups of 1 to 5 carbon atoms, cyano moieties, carboxyl moieties, alkoxy carbonyl groups of 1 to 5 carbon atoms and sulphonic acid moieties; an aryl group of up to 10 carbon atoms, optionally substituted with one or more substituents which are members selected from the group consisting of an alkyl group of 1 to 5 carbon atoms, halogen atoms, hydroxy moieties, alkoxy groups of 1 to 5 carbon atoms, cyano moieties, carboxyl moieties, alkoxy carbonyl groups of 1 to 50 carbon atoms and sulphonic acid moieties; $-CO_2H$; $-CO_2M^{\oplus}$ (wherein $M^{\oplus}$ is defined previously); or $CO_2R^{12}$, wherein $R^{12}$ is an alkyl group of 1 to 5 carbon atoms, optionally substituted with one or more substituents which are members selected from the group consisting of halogen atoms, hydroxy moieties, alkoxy groups of 1 to 5 carbon atoms and cyano moieties.

2. A compound according to claim 1 wherein each $R^1$ is a phenyl groups, optionally substituted with one or more sulphonic acid moieties.

3. A compound according to claim 2 wherein each $R^2$ is an alkoxy carbonyl group of 1 to 5 carbon atoms.

4. A compound according to claim 1 wherein: each $R^1$ represents

and, each $R^2$ represents $-CO_2CH_2CH_3$.

5. A new compound according to claim 1 having the formula

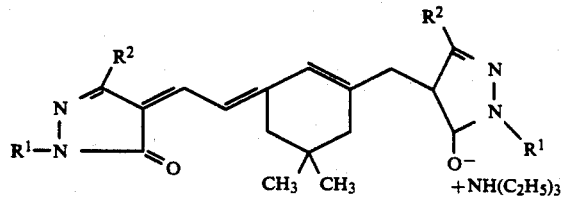

wherein $R^2$ is $-CO_2CH_2CH_3$, and

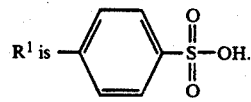

* * * * *